Oct. 15, 1957 D. H. JACOBS 2,809,783

MAGNETIC STORAGE DEVICE AND STORAGE UNITS

Filed Jan. 14, 1952 5 Sheets-Sheet 1

Donald H. Jacobs
INVENTOR

Oct. 15, 1957 D. H. JACOBS 2,809,783

MAGNETIC STORAGE DEVICE AND STORAGE UNITS

Filed Jan. 14, 1952 5 Sheets-Sheet 2

SQUARE PULSE GENERATOR 124 a, b, c, d

AMPLIFIER 125 a, b

AMPLIFIER 126 a, b

Donald H. Jacobs
INVENTOR

STORAGE UNIT & GATE 121 a,b,c,d, e,f

AMPLIFIER 128 a,b

READ OUT GATE 129 a,b,c,d,e,f

CATHODE FOLLOWER 122 a,b,c

Donald H Jacobs
INVENTOR

Donald H. Jacobs
INVENTOR

Donald H Jacobs, INVENTOR 2,809,783
Patented Oct. 15, 1957

1

2,809,783

MAGNETIC STORAGE DEVICE AND STORAGE UNITS

Donald H. Jacobs, Brookdale, Md.

Application January 14, 1952, Serial No. 266,371

24 Claims. (Cl. 235—61)

This invention comprises a new and improved type of magnetic storage device having a number of storage units, capable of being magnetized positively or negatively to indicate the presence or absence of a digit, or vice versa, or to indicate other items of information and adapted for use with a digital computer, or for storing information for a wide variety of other purposes.

It is an object of this invention to provide a storage unit comprising a core of magnetic material, which can be magnetized to indicate the presence or absence of a digit or value.

It is another object of the invention to provide a storage unit which will use a minimum of power and generate a minimum of heat, thus avoiding the difficulty of dissipating the unwanted heat, which is a real problem in many storage units hitherto used in computers and for other purposes.

In connection with the development of a high speed, ultra-compact digital computer, a requirement arose for a compact medium for the storage of information. Because the computer utilized binary arithmetic, a medium having two states was required. Because this type of computer required information to be stored statically (i. e. without circulation, as in a delay line), the storage element was required to have two stable states. It must be possible to place the storage element in one state or the other in order to store a single digit, and it must be possible to detect, at some later time, the state of the storage element in order to determine the value of the digit. A register capable of storing a number comprising *n* digits could obviously be assembled from *n* storage elements or units of this type. The storage elements or units comprising a register can be interrogated simultaneously to determine the values of the digits stored therein, and this is called a parallel type of register because all stages can be read out simultaneously, in parallel. Hence a binary number comprising any number of digits can be read out of the register in the same time that it takes to read out the value of a single digit. This is an imporant advantage of the parallel type of register.

Any material possessing suitable magnetic retentive properties may be used for magnetic storage. When a winding is put on a core of this material, the material can be magnetized partly or completely in either one of two directions, these directions corresponding to different orientations of the magnetic domains of the core material. If a D.-C. voltage is suddenly applied to the winding on a core, through a resistance, the voltage across the core rises suddenly and falls, not exponentially as it would with a pure inductance, but slowly at first until all the magnetic domains in the core have been orientated in one direction. It then follows an approximately exponential decay. Another way of expressing this is to say the magnetic material has a relatively high permeability and therefore the coil wound on it has high inductance until the magnetic material has been fully magnetized in one direction, at which time the permeability (and inductance of the coil) suddently decreases.

2

A magnetic core, with a winding thereon, will be called an "inductor" herein.

Because magnetic materials have stable magnetic states, they are suitable for use as storage elements.

A representative magnetic core contains only a single 300-turn winding of wire, and such a core, with its winding, will be called a storage element or inductor. When this winding is connected through a 5,000 ohm resistor to a pulse source and a 35-volt input pulse is applied to the winding through the resistor, the current drawn by the core is such as to reduce the amplitude of the output pulse across the winding to 22 volts. The input pulse is measured before the series resistance; the output pulse is measured across the core winding. The rise time of the pulse at the winding is approximately ½ microsecond.

In one embodiment two pulse generators are connected to one side of the winding, each through a 10,000 ohm resistor. The other side of the winding is connected to ground. One of the pulse generators magnetizes the core positively, using a positive pulse. The other pulse generator magnetizes the core negatively, with a negative pulse. The storage elements or units (in a register) in which digits (1's for exmaple) are to be stored are pulsed positively, and the storage elements in which no digits (0's) are to be stored are not pulsed, and are thus left negatively magnetized. The digits which are present in the individual storage elements are read out by pulsing all elements simultaneously with negative pulses, thus leaving all elements in a negative magnetic state. These negative pulses might be termed "interrogating pulses." The interrogating pulse applied to each element is of 8 microseconds duration. The output of each element is a pulse of about 1 microsecond duration if there is no digit stored in it, and is a pulse of about 5 microseconds duration if a digit was stored in the element. The longer pulse obtained from the magnetized element is caused by the back E. M. F. resulting from the flux change which occurs when the state of magnetization of the core is reversed.

Because the storage elements are only pulsed at the times when information is stored in them, and when information is read out, the amount of power involved in storing and reading is very small indeed. No heating of the cores is encountered as is the case when magnetic cores are used to form a delay line for serial type storage. A 40-digit number can be stored in one of our registers in about 5 microseconds, and can be read out in about 2–4 microseconds. Hence this type of register is very well adapted to the high speed type of binary computer with which it can be used.

A preferred emobdiment of the invention is shown by way example in the accompanying drawings, wherein:

Fig. 1 is a schematic view of a spiral tape magnetic core, and a winding for magnetizing it positively or negatively.

Figs. 2*a* to 2*d* illustrate diagrammatically the wave form of the voltage impressed on the coil (wound on the core) under different conditions.

Figure 7A:
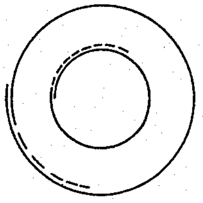

Fig. 7*a* shows one type of core before the wire winding is applied.

Figure 7B:
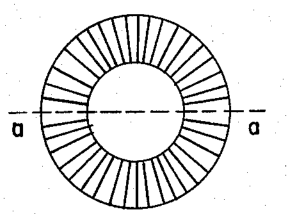

Fig. 7*b* shows a core with the winding in place (i. e., an inductor).

Figure 7C:
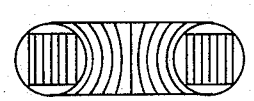

Fig. 7c is a cross-section through the core on the line a—a of Fig. 7b.

Figure 8:
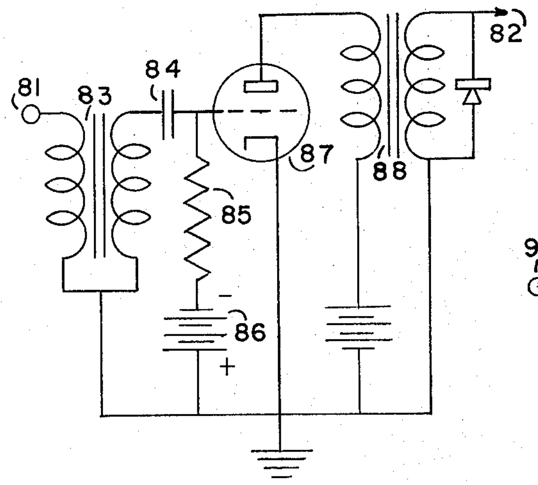
Figure 12:
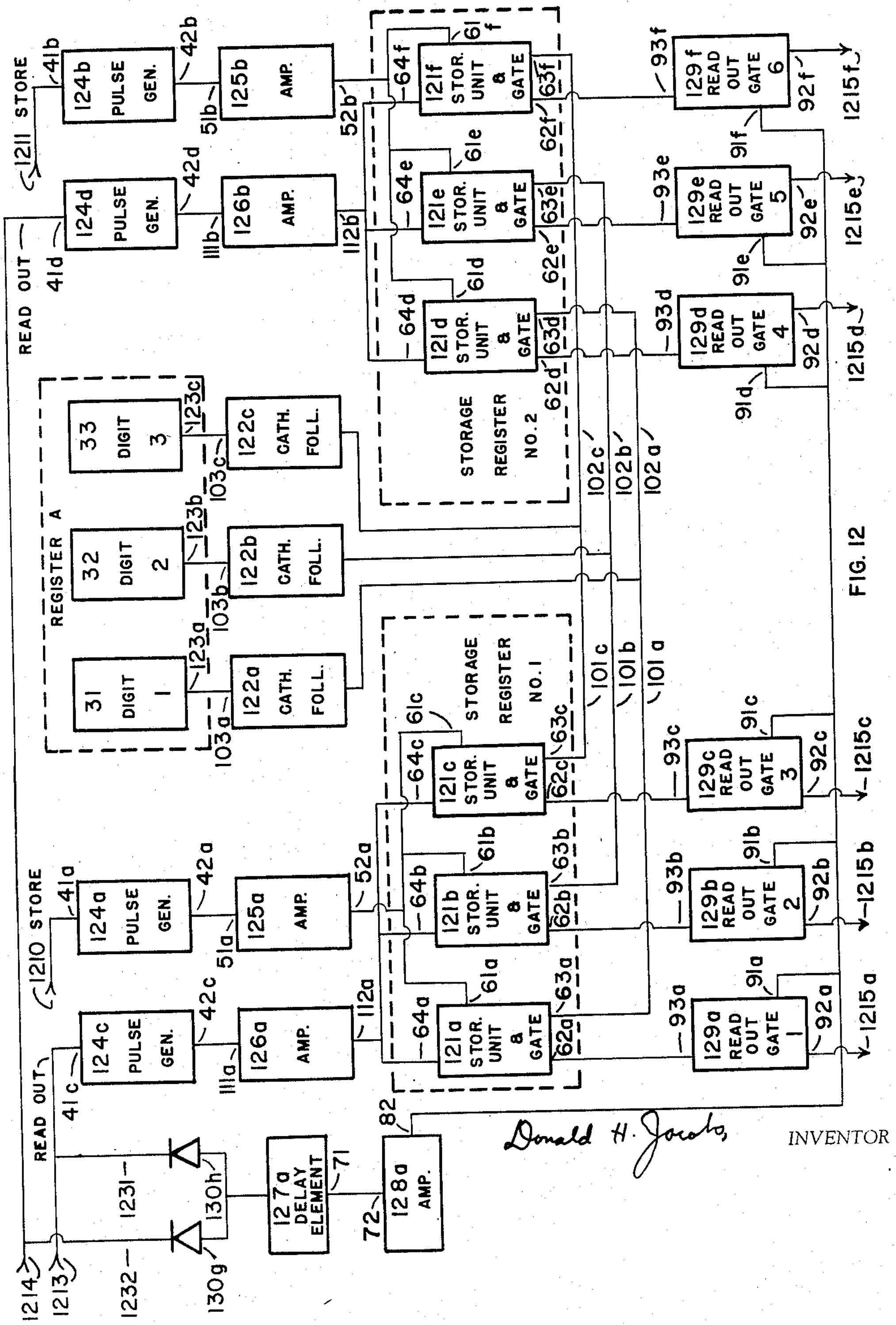

Fig. 8 is a drawing of the circuit of a representative amplifier used for 128a in Fig. 12.

Figure 9:
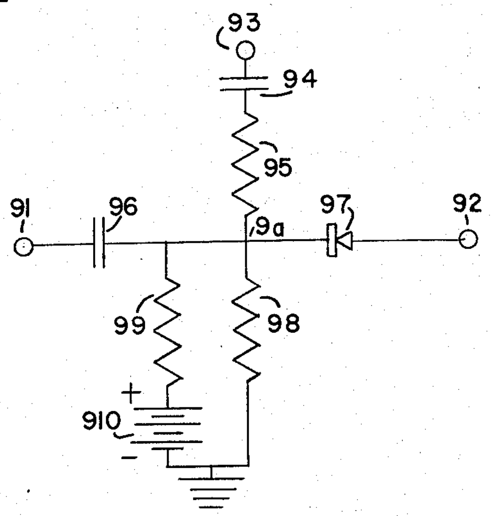

Fig. 9 shows a representative gating circuit (128a–f, Fig. 12) for reading the register.

Figure 10:
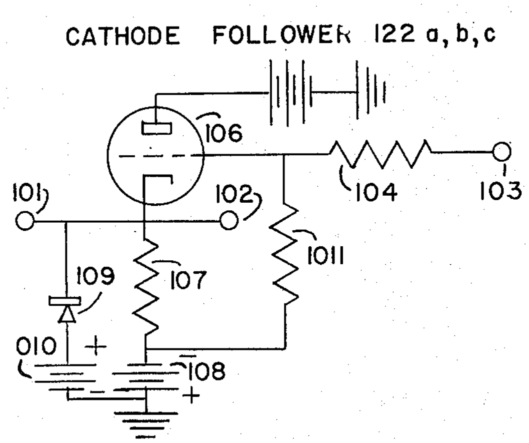

Fig. 10 shows a representative circuit of the cathode follower (122a–c, Fig. 12) connected to the read-in gates.

Figure 11:
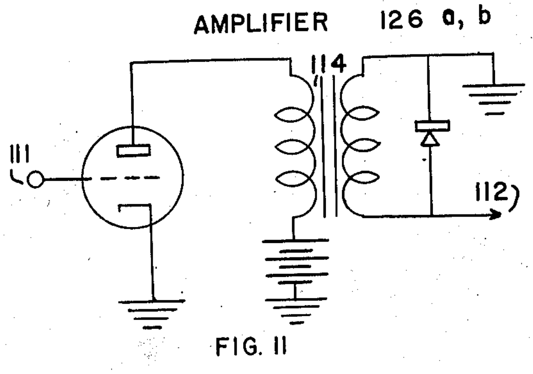

Fig. 11 shows a representative circuit of the amplifiers shown as 126a and *b*, Fig. 12.

Fig. 12 is a representative diagrammatic view of the invention and associated circuitry.

Figure 13:
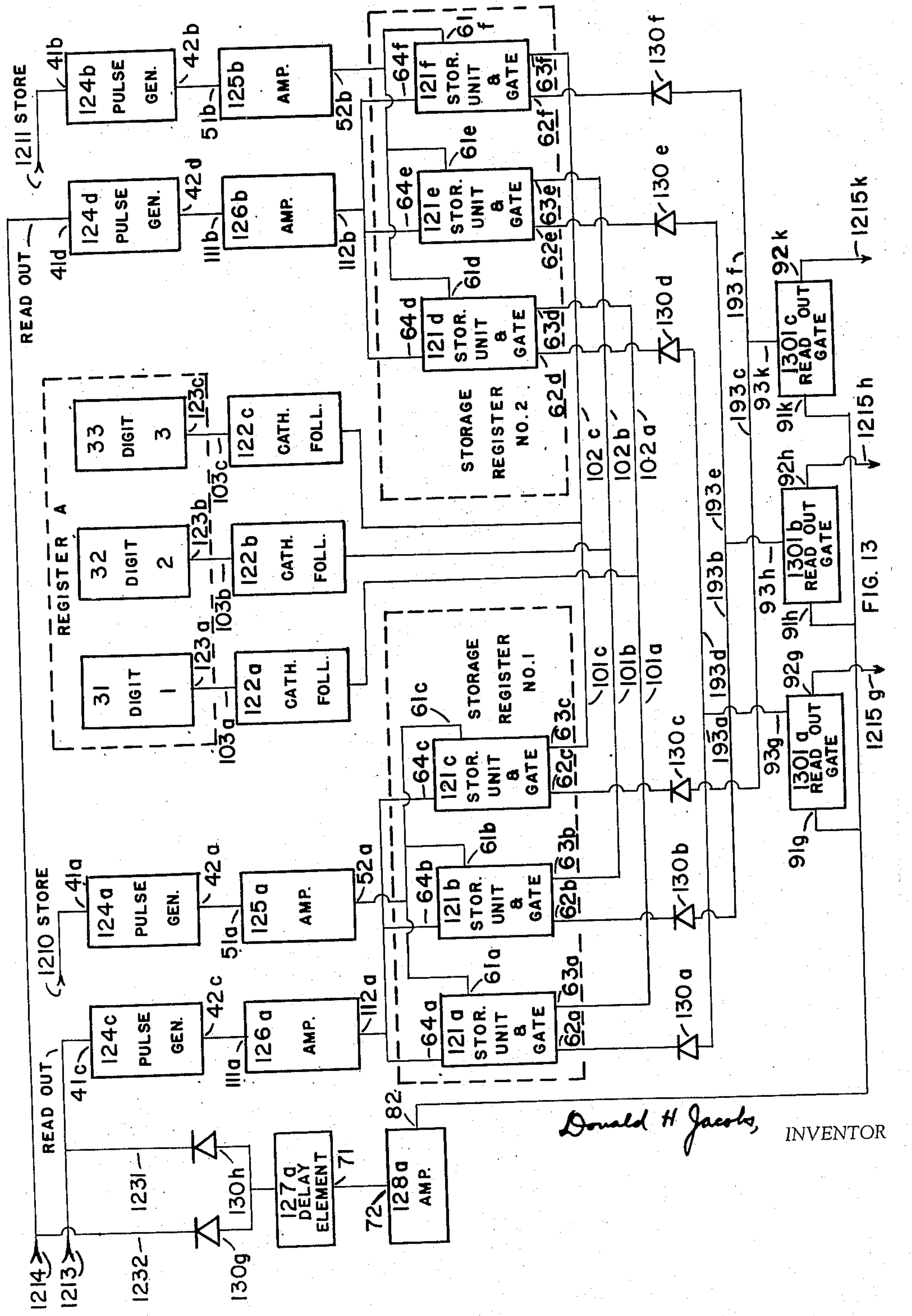

Fig. 13 shows an embodiment different from that of Fig. 12.

Figure 14:
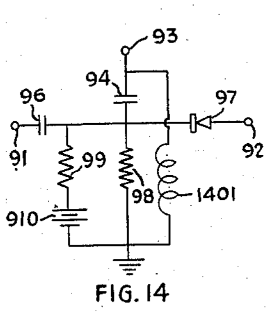

Fig. 14 shows a read-out gate for use with Fig. 13.

Figure 1:
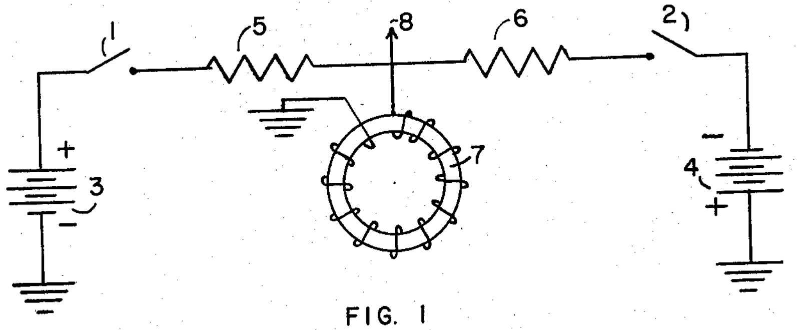
Figure 2A:
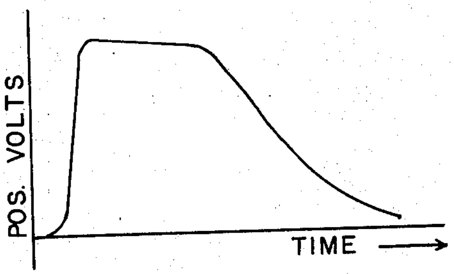
Figure 2B:
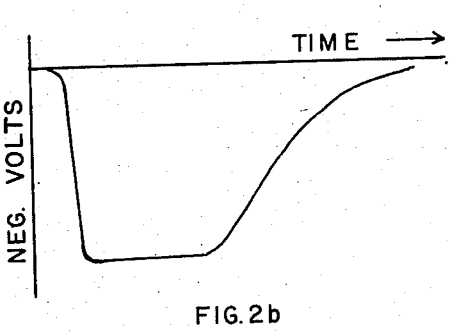
Figure 2C:
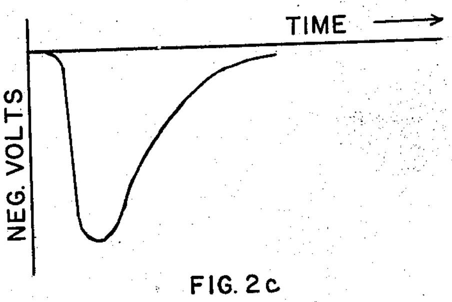

Fig. 1 shows an inductor 7 utilizing a magnetic core having high magnetic retentive properties. This inductor 7 will be referred to as the inductor. One terminal of the coil winding of the inductor is grounded, as shown. The other terminal is connected through resistance 5 and switch 1 to the current source 3. The same terminal of the coil is also connected through resistance 6 and switch 2 to the other current source 4 of opposite polarity. When switch 1 is closed the voltage at 8 (all voltages are referenced to ground, unless otherwise stated) in Fig. 1 appears as shown in Fig. 2a. If switch 1 is reopened and switch 2 is closed the voltage at point 8 would be as shown in Fig. 2b. If switch 2 is opened and reclosed the voltage at 8 would appear as shown in Fig. 2c. (The voltages induced in the inductor when the switches are opened are not shown.)

It will be seen that the different wave forms of Fig. 2b and 2c indicate whether switch 1 was closed or not, before switch 2 was operated, and this information is stored in the inductor by means of the orientation of the magnetic domains therein. The operation of switch 2 represents the interrogation of the inductor.

The invention comprises means for magnetizing or partly magnetizing the cores to retain the information that a certain digit in the computer was in a certain state at a certain time. Not magnetizing the core indicates said digit was in the alternate state.

Figure 2D:
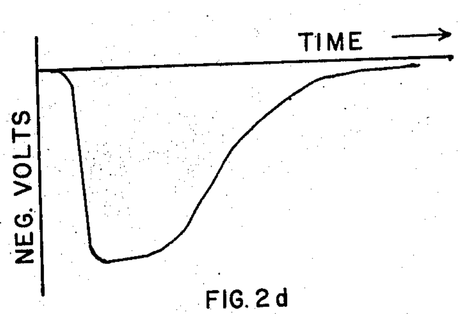

If the switch 1 in Fig. 1 were closed for a very short time such that the inductor was only partly magnetized in one direction, then on opening switch 1 and closing switch 2 the wave form at 8 on Fig. 1 might be more like Fig. 2d than 2b, i. e. the voltage would stay high for a shorter time. However the device is still operable and useful (because 2d is physically distinguishable from 2c) and requires less power for operation at very high speeds than would be required for full reversal of the magnetic state of the inductor.

To make use of the invention, it must be supposed that a digital computer has a register containing a binary (or coded-binary) number of *n* digits. This is represented diagrammatically in Fig. 3 where stages 31, 32, and 33 in register A might for example be bi-stable circuits well known in the art for example, the circuit shown in Fig. 5.4 of "Waveforms" by Chance et al. (McGraw-Hill, 1949) and might provide voltages at 34, 35, and 36 (which are represented by the point common to a diode and triode plate in the above-mentioned figure) whose magnitudes would indicate the presence of a 1 or 0 binary digit in each of the three stages or digit spaces shown. If such a register were connected to the invention shown in Fig. 12 and a pulse of the proper polarity were applied at line 1210, then the number contained in register A would be stored in the inductors contained together with other components in blocks 121a, 121b, 121c.

The invention shown in Fig. 12 is described as follows with the aid of Figs. 4–11 which show details of the blocks in Fig. 12.

Figure 3:
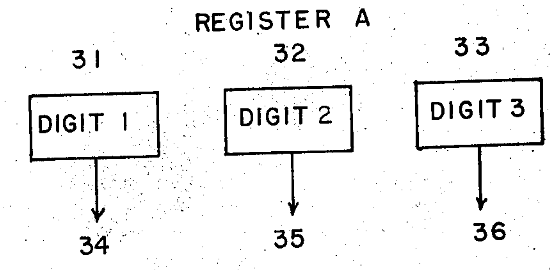
Fig. 3 is a diagrammatic view of a binary register having three digit spaces, i. e. a three-stage register.

The computer register A of the type shown in Fig. 3 is connected to points 123a, *b*, and *c* in Fig. 12. If now the binary number in register A is to be transferred into storage register No. 1 (comprising 121a, *b*, *c*) a negative trigger pulse (read-in pulse) is applied via line 1210 to the block 124a representing a square pulse generator.

Figure 4:
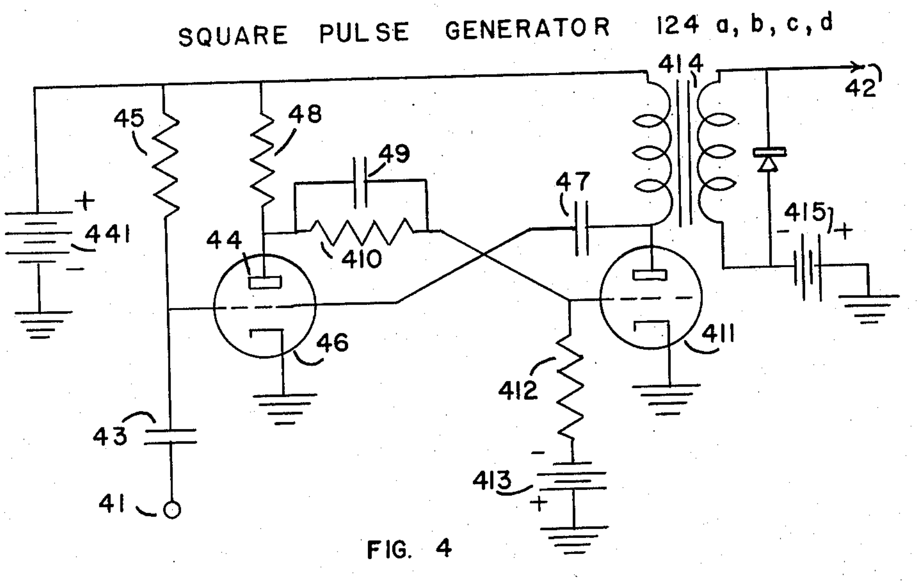
Fig. 4 illustrates a representative square pulse generator (124*a–d*, Fig. 12).

This generator is shown in detail in Fig. 4. It is similar to a conventional delay multivibrator (or monostable multivibrator) except that a transformer 414 is connected to the anode of tube 411 in place of the resistance conventionally used. Input 41, which is connected to line 1210 of Fig. 12, is connected to the grid of tube 46 through condenser 43. Battery 441, which is grounded on the frame, is also connected to the grid through resistance 45. The anode 44 is also connected to battery 441, through resistance 48, and to one side of the transformer 414. Anode 44 is also connected to the grid of tube 411 through resistance 410 across which condenser 49 is shunted. The grid of tube 411 is also connected through resistance 412 to battery 413, which has its other terminal grounded on the frame. This device generates a square wave at the output of transformer 414, i. e. on line 42. A bias source 415 is used as a convenient bias for the amplifier shown in Fig. 5.

Figure 5:
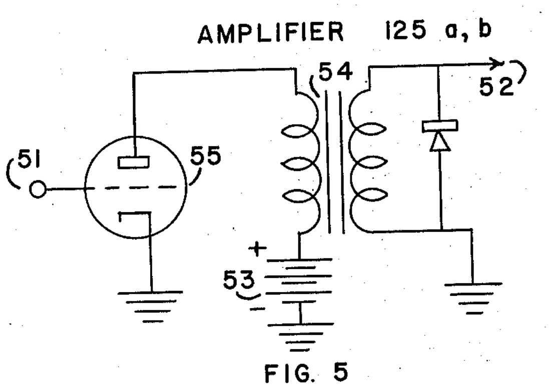
Fig. 5 shows an amplifier circuit used at 125*a* and *b* (Fig. 12).

The positive square pulse which appears at 42a in Fig. 12 is applied to amplifier 125a (Fig. 12) via line 51a. This is connected to point 51 of Fig. 5. Amplifier 125a is shown in Fig. 5. A positive pulse applied at line 51 connected to the grid of tube 55 provides a positive pulse on line 52 connected to the output of transformer 54. The anode of tube 55 and the battery 53 are connected to the other side of the transformer as shown in Fig. 5. The transformer 54 is designed to pass a square pulse of limited duration. Amplifier 125 is connected in parallel to the storage units 121a, *b*, *c*, by a wire from the point 52a, as shown in Fig. 12.

Figure 6:
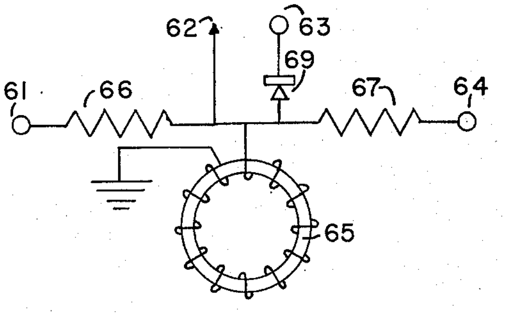
Fig. 6 shows the circuit used with the magnetic core storage units and the read-in gate (121*a–f*, Fig. 12).

The pulse from 52a (Fig. 12) is conducted to points 61a, 61b, 61c in blocks 121a, 121b, 121c, these blocks (cathode followers) having the construction shown in Fig. 6. In this figure, point 61 corresponds to 61a, 61b, 61c, and so on. Fig. 6 illustrates how the amplifier 125a is connected to each magnetic storage unit through a resistor 66. Fig. 6 also shows the mode of connecting the storage unit and read-in gate (121a, *b*, *c*) to the line 62 (shown as 62a, *b*, *c*, in Fig. 12) leading to the read-out gates 1, 2, 3, and to the line 64 (through resistor 67) coming from the read-out amplifier 126a. The read-out mechanism will be described later. A positive pulse taken to point 61 in Fig. 6 (from amplifier 125a) will magnetize the core in the inductor 65 (so that it will indicate a digit is stored) providing a positive D.-C. voltage is present simultaneously on line 63. This is the operation of storing a digit. If line 63 is held at or near zero voltage (i. e. no digit is to be stored), the crystal read-in gate 69 will bypass the pulse from 61 along lines 63 and 101 (Fig. 10) to which line 63 is connected. This occurs because the anode of the crystal cannot be made positive with respect to the cathode without the crystal conducting. An alternative method of using the read-in gate is to have it in series with line 61, and thus permit it to inhibit or transmit a storage pulse to the inductor winding. Again this gate would be controlled by cathode follower 122 (Fig. 10).

The potential on line 63a (Fig. 12) is controlled by the cathode follower, represented by block 122a, via conductor 101a. Fig. 10 shows the construction of block 122a, *b*, *c*. Fig. 10 shows a cathode follower circuit in which the cathode of tube 106 is taken to a negative potential, via resistance 107 to battery 108. The grid potential is controlled by line 103 (which represents 103a, *b*, *c* in Fig. 12) from the computer register whose contents are to be stored, and may be varied between two positive potentials. At the lower positive potential of line 103, the grid of tube 106 is caused to be negative by resistance network 104 and 1011, and bias battery 108. The cathode is prevented from going negative by the rectifier 109 and battery (or potential source) 1010, and is caused to remain slightly positive. At the higher positive potential of 103, the cathode of tube 106 assumes a potential very near the grid potential. As many outputs are provided as there are storage registers. For the case illustrated in Fig. 12, two storage registers (1 and 2) are shown. Many more can be added without changing the spirit of the invention. Connections 101 and 102 of Fig. 10 go to the appropriate stages in these two registers. The core of the inductor cannot be magnetized by the pulse from 61 unless there is a digit in the corresponding stage in the register of Fig. 3 and the voltage indicating the presence of such a digit is on line 103 of the gate unit (Fig. 10) and hence on line 101 which is connected to input point 63 of Fig. 6.

Should it be desired to transfer a number in register A to storage register No. 2, this can be performed in the same fashion as described above, but the pulse initiating this transfer is placed on line 1211 instead of 1210. More storage registers can be added, if desired. Registers A, 1, and 2 in Fig. 12 have only three stages (i. e. can hold only three binary digits), but more stages can be added to each register.

When it is desired to read out the information held in magnetic storage the following procedure is used. To read out the contents of No. 1 magnetic storage register, a pulse is applied to line 1213 of Fig. 12. This is connected to point 41 of the square wave generator **124*c* (which can be identical to 124*a* already described and illustrated in Fig. 4) to actuate the amplifier 126*a*, shown in Fig. 11. This amplifier is similar to that shown in Fig. 5 already described except that the positions of the ground connection and the output point of transformer 114 (corresponding to transformer 54 in Fig. 5) have been reversed so that when it receives a positive pulse at 111, its input, it emits a negative square wave at point 112, its output. Point 112 is connected in parallel to points 64*a*, *b*, *c*, of the storage units 121*a*, *b*, *c*, as shown in Fig. 12. This negative square wave enters the magnetic storage unit 121*a* via line 64*a* (shown as 64** in Fig. 6) and reverses the magnetic state of the core in the inductor if the inductor had previously received a positive pulse (i. e. if, say, a "1" were stored in it). When this happens a long pulse (Fig. 2*b* or 2*d*) issues from unit **121*a* via line 62*a* (62 in Fig. 10) and is taken to read-out gate 129*a* via line 93*a*. If the inductor (7** in Fig. 1) had not previously received a positive pulse (i. e. if, say, a "0" were stored in it), a short pulse (Fig. 2*c*) issues from **121*a* on 62*a***.

Fig. 9 shows the construction of read-out gates 129. The negative pulse enters at 93. Now if the magnetic state of the inductor core were reversed by the pulse from amplifier **126*a*, a relatively long pulse would be applied at 93; if the magnetic state of the inductor core had not been reversed, a relatively short pulse would be applied at 93. The pulse passes through condenser 94 and resistance 95 and brings point 9*a* to a near-zero potential. 9*a* is also connected to the grounded resistance 98. A line from 91 is also connected to point 9*a* through condenser 96 and has grounded current source 910 connected to it at an intermediate point through resistance 99 which holds point 9*a*** normally positive.

When line 1213 (Fig. 12) is pulsed, the pulse travels through delay element 127 (which is any conventional device, such as a delay line or monostable multivibrator, for delaying its output relative to its input) via line 71 and along line 72 to the amplifier **128*a*. A negative pulse issues from 82 (Fig. 12) and enters gate 129*a* at 91*a***. This pulse may be called a reading pulse.

If a long gating pulse (indicating, say, a "1") were received at 93 (Fig. 9), point **9*a* would still be near zero potential when the delayed pulse arrived at 91 and the line from 91 through 9*a* to 92 would be in conductive condition. Then the delayed pulse would pass through condenser 96 to point 9*a*, through crystal 97 and on to the output 92 and would be received by any appropriate device connected to 92**. The presence of this pulse would indicate that (say) a "1" had been stored.

If, however, a short gating pulse were received at 93 indicating, say, that a "0" had been stored, point **9*a* would be no longer negative when the delayed pulse arrived at 91; the line from 91 through 9*a* to 92 would be in non-conductive condition; and no pulse would issue from 92. This would indicate to any device connected to 92** that, say, a "0" had been stored.

When a pulse is applied to point 1213 in Fig. 12, gates **129*a*, *b*, *c* will be open and a delayed pulse will issue from points 92*a*, 92*b*, and 92*c* only if each inductor in units 121*a*, 121*b*, 121*c* had been put into a correct magnetic state (representing a certain digit stored in each). In other words, pulses appear only at 92*a*, *b*, and *c* if the associated inductor cores had been previously magnetized in the correct direction. The storage register No. 2, comprising units 121*d*, *e*, and *f*, is read out on lines 1215*d*, *e*, and *f* by pulsing line 1214**, and it acts in the same manner as storage register No. 1.

The construction of amplifier **128*a*, above mentioned, is shown in Fig. 8. The pulse comes in on line 81 (connected to 72 in Fig. 12) through transformer 83 and capacitor 84, to the grid of tube 87. This grid also has battery 86 connected to it through resistance 85. From the anode of tube 87 a wire leads to one side of the transformer 88, and the output 82** of the amplifier comes from the other side of this transformer.

To summarize the operation of the invention: Register A of Fig. 3 is connected to lines **123*a*, *b*, *c* in Fig. 12. Each unit of the register representing a single digit space (i. e. a single stage) is connected to a cathode follower 122*a–c*. These are in turn individually connected to the storage units and gates 121*a–c* comprising register No. 1, and to the storage units and gates 121*d–f*** comprising register No. 2. With the construction of this invention one cathode follower can be used to control a large number of storage units and gates in different registers.

When it is desired to transfer the number in register A to register No. 1, a negative pulse is applied at 1210 which triggers pulse generator **124*a*. This in turn operates amplifier 125*a*. A positive read-in pulse issuing from amplifier 125*a* will magnetize one or more cores of the storage units 121*a–c* if a positive D.-C. voltage, indicating the presence of a digit in the corresponding units of register A, is applied to the storage units and gates on lines 63*a–c* from the cathode followers 122*a–c***. Thus for every space or stage in register A which contains a digit, the core of the correspondingly situated storage unit of register 1 will be magnetized.

If it is desired, the number from register A may be stored in register No. 2 instead of in register No. 1 by applying a pulse at 1211. This passes via **124*b* and 125*b*, to line 52*b* connected to the storage units and gates 121*d–f*** of register No. 2.

When it is desired to read out the number contained in register No. 1 to some other device, a negative pulse is applied at 1213 and passes thence to the storage units and gates **121*a–c* at 64*a–c*. This negative pulse, when applied to storage units, produces a long or a short pulse from each storage unit which is applied to the read-out gates 129*a–c* at control points 93*a–c* according to whether a digit (i. e. say, a "1") was or was not stored in the units 121*a–c*. Then when the delayed reading pulse from 82 reaches the read-out gates 129*a–c* at points 91*a–c*, a pulse can issue from each read-out gate at output points 92*a–c*** only if the pulse from the corresponding storage unit was long enough to indicate the presence of a digit therein.

Register No. 2 is read out in a corresponding manner by applying a negative pulse at 1214 and obtaining the results at the outputs of gates **129*d–f***.

It is obvious that the register could also be built with various parts working in reverse to those shown above, e. g., gates could be normally left open and be closed by the same signal which has been described as opening them.

Reading a storage register by applying a negative pulse to each storage unit automatically clears the register of the number stored therein, leaving all units in a cleared state, ready to receive the next number to be stored in the register.

The register necessarily includes many units which are duplicates of each other. In Fig. 12 these duplicate elements are identified by using the same reference number with a different subscript, e. g. 64*a* to 64*f*. While all the principal reference numbers are used in the description, it seemed unnecessary to burden the specification with every subscript clear up to *f*. The purpose and function of each of these duplicate elements will be clear from the description and drawing. The points and elements in the circuit diagrams which are represented by numbers (e. g. 64) are represented in the block diagrams by the same numbers with letters attached (e. g. 64*a*, 64*b*, etc.).

An important advantage of this type of magnetic storage unit resides in the length of time that the cores will retain their magnetized condition. By mounting a battery of the cores and cooperating parts on a removable assembly, it would be possible to store information in the units, remove the assembly, replace it with another (if desired), and place the assembly with the information stored therein in storage until it was later desired to make use of the information stored therein. It will be noted that this device does not require the continuous application of power to keep values in storage.

Thus, when running a series of tests with mechanism or apparatus of any kind the result of each test could be stored in a set of these storage units and the entire series could be saved until it was later desired to take them out, place them in position for reading the results and thus make use of the information contained therein.

A second embodiment of the invention is shown in Fig. 13. This embodiment differs basically from that shown in Fig. 12 in that only a single set of read-out gates (1301*a–c*) is used for a plurality of storage registers instead of a different set of such gates for each storage register. In the example shown in Fig. 13, two storage registers, each comprising only three digits, are shown. The invention can be extended to a greater or lesser number of storage registers and digits. The same statement is valid relative to Fig. 12.

Fig. 13 shows two storage registers (Nos. 1 and 2) which are identical to the two shown in Fig. 12. Information is stored in these registers in the same fashion as it is stored in Fig. 12. The read-out procedure is different, however. It will be noted that the first digit stage (121*a*) of register No. 1 and the first digit stage (121*d*) of register No. 2 are both connected (via isolation rectifiers 130*a* and 130*d*) to read-out gate 1301*a*. If there were more storage registers, the first digit stage of each would also be connected to 1301*a*. Similarly the second and third stages of each register are connected jointly to read-out gates 1301*b* and 1301*c*. If the registers had more stages, a proportionate number of additional read-out gates would be required.

Read-out gates 1301*a*, *b*, *c* have the construction shown in Fig. 14. They will be seen to be similar to the gate shown in Fig. 9, and operate in the same general fashion. Resistance 95 has been eliminated in Fig. 14 because the isolation rectifiers (130*a–f*) provide resistance in lines 93*a–f*. The inductance 1401 has been added to the circuit to permit the charge on condenser 94 to leak off to ground, and at a rate which will not be too great to cause changes in wave forms.

The isolation rectifiers (130*a–h*) in Figs. 12 and 13 can comprise rectifying crystals or vacuum tube rectifiers. Their function is to prevent pulses from getting into the many circuits. If one wishes to read-out register No. 1, a pulse is applied to point 1213. This pulse could travel down line 1231 and back up line 1232, thereby involuntarily causing register No. 2 to be read out simultaneously, were it not for the presence of rectifier 130*g*, and vice versa with line 1214 and rectifier 130*h*. Similarly, a pulse issuing from 121*a* along line 193*a*, and routed to 1301*a*, is prevented from travelling up line 193*d* by crystal 130*d*. The remaining crystals perform similar functions.

Register 1 of Fig. 13 is read out by applying a negative pulse at point 1213, and register 2 is read out by applying a pulse at 1214. The read-out process takes place in the identical fashion to that described in connection with Fig. 12. After a definite timed interval a delayed pulse will issue from delay element 127*a* to the read-out gates.

Specific embodiments of the invention have been described by way of example. However, it is obvious that the same result may be produced with apparatus widely different from that of the present disclosure. It, therefore, is to be understood that this invention is not limited to the mechanism disclosed herein but that it includes all the modifications and variations coming within the scope of the appended claims.

Having thus described my invention, what I claim as new and desire to secure by Letters Patent is:

1. In a storage register, a plurality of storage elements, each comprising a core of magnetic material, a wire winding around each core, means for applying a magnetizing pulse, parallel connections from said means to each of said windings, to store information in said elements, means having parallel connections to each of said windings for applying an interrogating pulse simultaneously thereto, a like plurality of normally non-conductive gating devices each connected to a different one of said windings and rendered conductive by a pulse therefrom for conducting a read-out pulse through said gating devices and a delay device activated simultaneously with said interrogating pulse and having output connections for carrying a pulse simultaneously to each of said gating devices after a predetermined delay interval.

2. In a device of the kind described, a plurality of storage elements, a like plurality of gates, each connected to a different one of said storage elements, means for sending to each gate from its connected storage element a pulse which is longer or shorter according to the value stored in said storage element, and a delay element having parallel connections to each of said storage elements and timed to deliver a read-out pulse thereto within the interval between said longer and shorter pulses.

3. A register having a plurality of digit representing bi-stable devices, a storage register having a like plurality of cores of magnetizable material, means for sending a magnetizing pulse to said cores, means connecting the core in each denominational order of said storage register to the bi-stable device in the same denominational order of the first named register and controlled by the condition of said bi-stable devices for preventing said magnetizing pulse from magnetizing those cores which are connected to bi-stable devices which are in the condition representing a given digit.

4. A storage device comprising a core of magnetic material, a single wire winding around said core, means connected to said winding for applying a pulse of one polarity thereto, means also connected to said winding for applying a pulse of opposite polarity thereto and an output terminal connected to said winding for furnishing an output pulse therefrom, a gating device connected to receive pulses from said core, and a delay device activated simultaneously with said pulse of opposite polarity and connected to deliver a read-out pulse to said gating device after the delay imposed by said delay device.

5. In a device of the kind described, a register comprising a plurality of bi-stable devices, a storage register comprising a like plurality of storage elements, a like plurality of gating devices, each connected between the bi-stable device in one denominational order of said first register and the storage element in the same denominational order of said storage register, means for applying a magnetizing pulse, parallel connections from said means to each of said storage elements each of said storage elements comprising a magnetizable unit which may be magnetized or not by said magnetizing pulse depending on the bias applied to the gating device connected to said element by the condition of the bi-stable device to which same is connected, means for sensing the magnetized state of said storage elements and causing the same to deliver an output pulse which is longer or shorter according to whether the storage element is magnetized by said magnetizing pulse or not, a like plurality of gates, each connected to a different one of said storage elements to receive said output pulses, a delay device activated concurrently with said sensing means and constructed to deliver a delayed read-out pulse within the limits determined by said longer and shorter pulses and connections for carrying said delayed pulse simultaneously to said gates.

6. In a storage register, a plurality of storage elements each comprising a core of magnetic material and a single wire winding around the magnetic core, means for applying a pulse of one polarity to each of said wire windings simultaneously, other means for applying a pulse of opposite polarity to each of said wire windings simultaneously, a like plurality of gates, each connected to a different one of said storage elements, and means connected in parallel to each of said gates for applying a read-out pulse thereto.

7. A storage device comprising a plurality of storage elements each comprising a core of magnetic material and a separate wire winding around each core, means having parallel connections with said storage elements for applying a read-in pulse thereto and means also having parallel connections with said storage elements for applying a read-out pulse to each of said elements simultaneously.

8. The structure of claim 7 with the addition of a like plurality of gates, each gate being connected to a different storage element, each of said gates being controlled in accordance with the condition of the storage element to which it is connected and being held open by a pulse passed thereto through said storage element, and means also having parallel connections with said gates for applying a read-out pulse to each of said gates simultaneously.

9. In a storage register, a plurality of magnetic storage units, and means for reading the value stored in said units, comprising a pulse generator, parallel connections from the pulse generator to each of said storage units, a like plurality of read-out gates, each of said gates being connected to one of said storage units one to one to receive the pulse coming from said generator through said storage unit, a delay device actuated concurrently with said generator and connections from said delay device to deliver a pulse to each of said read-out gates at a predetermined interval after the arrival of the pulse at said storage units.

10. In a storage device, a binary register having a plurality of stages, a like plurality of cathode followers, connections from each stage of the register to a different one of said cathode followers, a plurality of magnetic storage units, said units being grouped together in a plurality of groups, means connecting each cathode follower to a separate unit of each group, separate means for applying a magnetizing pulse to each group of storage units, and means included in said connecting means for bypassing said pulse away from said storage units when said units do not have a given value stored therein.

11. In a device of the kind described, a plurality of storage elements, means for applying a storage pulse, parallel connections from said means to each of said storage elements, means for subsequently applying a second pulse simultaneously to said storage elements, a like plurality of read-out gates, each gate being separately connected to a separate storage element, so that each gate can receive an impulse from a different storage element, and a delay device activated simultaneously with said last-named means, said delay device being constructed and connected to apply a third pulse to all of said read-out gates simultaneously at a predetermined interval after said second pulse is applied to said storage elements.

12. In a storage device, a plurality of magnetic storage elements, means for applying a storage pulse, parallel connections from said means to each of said storage elements, means for applying an interrogating pulse simultaneously to said storage elements, a like plurality of read-out gates, each gate being separately connected to a separate storage element, so that each gate can receive an impulse from a different storage element and means to apply a read-out pulse to said gates a predetermined time after the application of said interrogating pulse.

13. In a storage device, a plurality of magnetic storage elements, means for applying a magnetizing read-in pulse of one polarity, parallel connections from said means to each of said storage elements to store a value therein, other means for applying an interrogating read-out pulse of opposite polarity, parallel connections from said other means to each of said storage elements, means for rendering said magnetizing pulse ineffective to magnetize said storage elements, a like plurality of gates, each gate being separately connected to a separate storage element, so that each gate can receive an impulse from a different storage element, said gates being operable to a conductive condition by a pulse received from said storage elements, and means for applying a read-out pulse to said gates at a predetermined time interval after the arrival of the pulse from said storage elements.

14. In a storage device, a plurality of magnetic storage elements, means for applying a storage pulse simultaneously to each of said storage elements, means for applying an interrogating pulse simultaneously to said storage elements, said storage elements comprising means for causing said interrogating pulse to issue therefrom as a longer or shorter pulse according to whether a given value is or is not stored in the storage element, a plurality of read-out gates one for each of said storage elements and connected thereto so that each gate can receive said longer or shorter pulse from a different storage element, said gates being operable to conductive condition by the pulse so received, and means for applying a read-out pulse simultaneously to said read-out gates at a predetermined time interval after the termination of said shorter pulse but before the termination of said longer pulse.

15. In a magnetic storage register, a plurality of storage elements, each comprising a core of magnetic material and a separate wire winding around said core, a like plurality of gates, each gate being separately connected to a separate storage element so that each gate can receive an impulse from a different storage element, each of said gates having a conductive condition and a non-conductive condition and being operable to a conductive condition by an impulse from the storage element to which it is connected, and a delay element having parallel connections with said gates.

16. In a storage device a binary register having a plurality of stages, a like plurality of storage units, means connecting said units to the stages of said register, and means for applying a read-in pulse with parallel connections from said last named means to each of said storage units, said units each comprising means for modifying said pulse and causing it to issue from each unit as a different pulse varying in length in accordance with the value stored in said unit.

17. In a storage device, a plurality of magnetic storage elements each comprising a core of magnetic material and a single wire winding around said core, a binary register having a like plurality of stages, a pulse generator with parallel connections therefrom to each of said windings, a like plurality of gating devices one for each of said stages and connected thereto, each gating device to a different stage, each gating device being controlled by the condition of the stage to which it is connected, and means connecting each gating device to a different one of said windings.

18. In a storage device, a plurality of storage elements, each comprising a core of magnetizable material and a wire winding thereon, a binary register having a like plurality of stages, a pulse generator, means connecting said generator to apply a pulse to said storage elements simultaneously, a like plurality of gating devices, means connecting each stage of said register to a different one of said windings, with a separate one of said gating devices included in each of said connecting means, and means for subsequently applying a second pulse simultaneously to said storage elements.

19. In a device of the kind described, a plurality of magnetic storage units, a binary register having a like plurality of stages, means connected in parallel to a group of said units for applying a magnetizing pulse thereto and a like plurality of means, one connected between each unit and a different one of the stages of said register for preventing said magnetizing pulse from magnetizing said unit.

20. The structure of claim 19 with the addition of a like plurality of read-out gates connected to said storage units one to one, means for applying another pulse simultaneously to said group of storage units, and a delay element connected to be actuated simultaneously with said last named means and also connected in parallel to said read-out gates.

21. In a device of the kind described, a binary register having a plurality of stages, a storage register comprising a like plurality of magnetic storage units each comprising a core of magnetic material and a wire winding thereon, a like plurality of gating devices each connected to a different one of the stages of said binary register and each presenting a voltage varying according to the values stored in said stages, means connecting each gating device to a different one of said windings and means connected in parallel to said windings for applying a magnetizing pulse thereto.

22. In a device of the kind described, a plurality of storage units and means for reading the values stored in said units comprising means for applying a read-out pulse simultaneously to each of said units, a like plurality of read-out gates, each having an input point connected to a different one of said storage units to receive the read-out pulse therefrom, and means for applying a delayed pulse simultaneously to another input point of each read-out gate, said gates having means whereby the concurrence of the read-out pulse and the delayed pulse will cause said read-out gates to operate.

23. In a device of the kind described, a plurality of magnetic storage units and means for reading the values stored in said units comprising, means connected in parallel to said units for applying a read-out pulse thereto, a delay element, and a like plurality of means, each connected to a different one of said storage units and also having parallel connections with said delay element and actuated by the concurrent receipt of pulses from a storage unit and from the delay element for receiving and transmitting signals of the values contained in said storage units.

24. In a device of the kind described, a binary register having a plurality of stages, a like plurality of magnetic storage elements, means connecting each storage element to a different one of the stages of said register, means for applying a storage pulse with parallel connections therefrom to said storage elements, means for applying a read-out pulse simultaneously to said storage elements, a delay element, and a like plurality of gates all connected to said delay element and each connected to a different one of said storage elements and actuated by concurrent pulses from said delay and storage elements for receiving and transmitting signals of the values stored in said storage elements.

References Cited in the file of this patent

UNITED STATES PATENTS

| | | |
|---|---|---|
| 2,430,457 | Dimond | Nov. 11, 1947 |
| 2,540,654 | Cohen et al. | Feb. 6, 1951 |
| 2,591,406 | Carter et al. | Apr. 1, 1952 |
| 2,604,262 | Phelps | July 22, 1952 |
| 2,614,167 | Kamm | Oct. 14, 1952 |
| 2,614,169 | Cohen et al. | Oct. 14, 1952 |
| 2,634,052 | Bloch | Apr. 7, 1953 |
| 2,706,597 | Crosman | Apr. 19, 1955 |
| 2,708,722 | Wang | May 17, 1955 |
| 2,734,187 | Rajchman | Feb. 7, 1956 |
| 2,767,908 | Thomas | Oct. 23, 1956 |

OTHER REFERENCES

"Magnetic Cores as Elements of Digital Computing Systems," by Nunro Haynes; University of Illinois; pages 30–32.

"Static Magnetic Memory for Low Cost Computers," by Kincaid et al.; Electronics, January 1951; pages 108–111.

High Speed Computing Devices by Engineering Research Assoc.; copyright July 28, 1950; pages 293–294.

Progress Report No. 2 on the "Edvac"—Moore School of Engineering; U. of Pa., June 1946; declassified Feb. 13, 1947; drawing sheet PY-0-164 and related description on pp. 4–22 and 4–23.